(12) United States Patent
Terada et al.

(10) Patent No.: US 7,861,293 B2
(45) Date of Patent: Dec. 28, 2010

(54) MOBILE TERMINAL AND AUTHENTICATION METHOD

(75) Inventors: Masayuki Terada, Yokosuka (JP);
Kensaku Mori, Yokohama (JP);
Kazuhiko Ishii, Yokohama (JP);
Sadayuki Hongo, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1052 days.

(21) Appl. No.: 11/374,053

(22) Filed: Mar. 14, 2006

(65) Prior Publication Data
US 2006/0245594 A1   Nov. 2, 2006

(30) Foreign Application Priority Data
Mar. 14, 2005   (JP)   .............. P2005-071328

(51) Int. Cl.
G06F 7/04       (2006.01)
G06F 12/14      (2006.01)
H04L 9/32       (2006.01)
H04L 29/06      (2006.01)

(52) U.S. Cl. .................. 726/19; 713/151; 713/168; 713/170; 713/194; 726/27

(58) Field of Classification Search .................. 726/19
See application file for complete search history.

(56) References Cited

U.S. PATENT DOCUMENTS

| | | | |
|---|---|---|---|
| 6,055,442 A * | 4/2000 | Dietrich | 455/558 |
| 6,415,144 B1 * | 7/2002 | Findikli et al. | 455/419 |
| 2002/0070273 A1 | 6/2002 | Fujll | |
| 2005/0105731 A1 | 5/2005 | Basquin | |

FOREIGN PATENT DOCUMENTS

| | | |
|---|---|---|
| DE | 600 08 531 T2 | 12/2004 |
| EP | 1 411 475 A1 | 4/2004 |

(Continued)

OTHER PUBLICATIONS

"ISO7816 part4 Interindustry commands for interchange" ISO/IEC, Sep. 1, 1995, Sect. 5.2, 5.5-6, 6.14-16, (with English translation).

(Continued)

*Primary Examiner*—Kaveh Abrishamkar
(74) *Attorney, Agent, or Firm*—Oblon, Spivak, McClelland, Maier & Neustadt, L.L.P.

(57) ABSTRACT

In a mobile terminal that performs transmission and reception of a message between an IC card and a terminal program, the security is improved by preventing an imposture of a source of a message or an interception of a message.

A mobile terminal comprises an IC card and a terminal program. The terminal program generates a program identifier (i1:1) from a domain ID "i1" of the IC card and a port number "1" that can be updated in the IC card. Then, a message is transmitted, the source ID of which is the program identifier and the destination ID of which is the identifier "i1:0" of the IC card. Upon receipt of the message, the IC card collates the domain ID with the domain ID that the IC card has, as to the source ID. When they coincide, processing in accordance with the contents of the above-mentioned message is performed.

9 Claims, 7 Drawing Sheets

FOREIGN PATENT DOCUMENTS

| | | |
|---|---|---|
| EP | 1 492 366 A1 | 12/2004 |
| EP | 1 513 121 A1 | 3/2005 |
| JP | 2000-048141 | 2/2000 |
| JP | 2003-203212 | 7/2003 |
| JP | 2003-337887 | 11/2003 |
| JP | 2004-320210 | 11/2004 |
| WO | WO 02/075677 A1 | 9/2002 |
| WO | WO 03/094557 A1 | 11/2003 |
| WO | WO 2004/019552 A1 | 3/2004 |

OTHER PUBLICATIONS

Smart Card Handbook $2^{nd}$ ed. (2000, John Wiley & Sons, Inc., W. Rankl and W. Effing) Sect. 6.6, 6.7, pp. 316-326.

C. Enrique Ortiz, et al., "An Introduction to Java Card Technology-Part 3, The Smart Card Host Application", http://developers.sun.com/techtopics/mobility/javacard/articles/javacard3/, Sep. 2003, 12 pages.

D. Haglmont, et al., "JCCAP: Capability-based Access Control for Java Card", Smart Card Research and Advanced Application, Sep. 2000, pp. 365-388.

\* cited by examiner

| REFERENCE INFORMATION (35a) | PROGRAM IDENTIFIER (35b) | HANDLER (35c) |
|---|---|---|
| p1 | (i1:1) | listener |

(b)

261

| MESSAGE TYPE (261a) | REMOTE TRANSMISSION (261b) |
|---|---|
| t1 | REFUSAL |
| t2 | REFUSAL |
| t3 | PERMISSION |
| ⋮ | ⋮ |

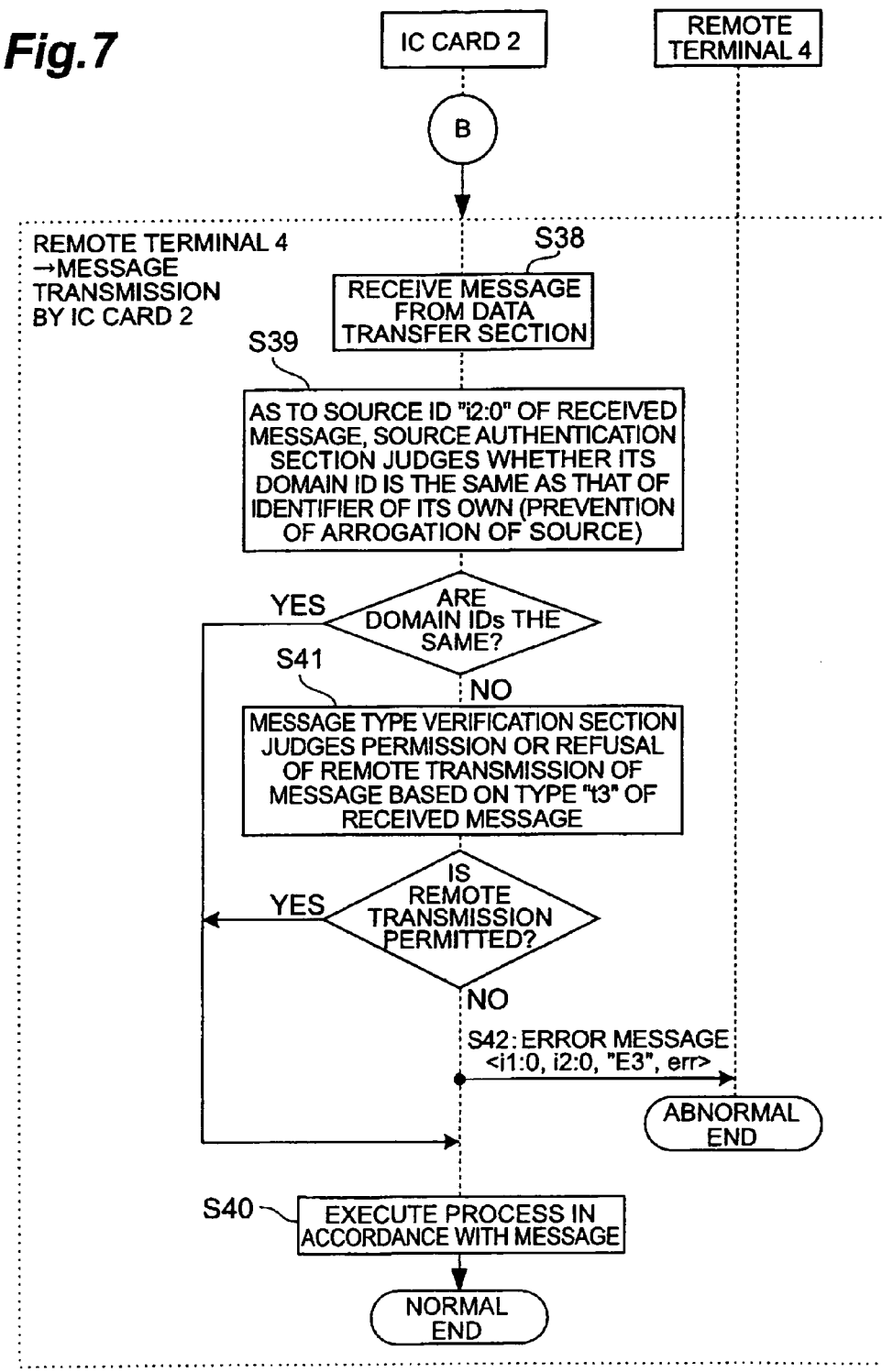

MOBILE TERMINAL AND AUTHENTICATION METHOD

BACKGROUND OF THE INVENTION

1. Field of the Invention

The present invention relates to an authentication technique of a program capable of accessing an IC card comprised by a mobile terminal.

2. Related Background of the Invention

Recently, as one of means for realizing ubiquitous computing, TRON (The Real-time Operating system Nucleus) is being developed. For a mobile terminal in which an IC (Integrated Circuit) card such as an e-TRON card is built-in, a technique has been proposed in which, when an electronic right value (hereinafter, referred to as an "electronic value"), such as an electronic ticket, is transmitted and received between terminals, transmission and reception of the electronic value is performed directly between both IC cards. As an example of a system in which such a technique has been applied to charging of the amount due of electronic value, an electronic value charge system assuring both high safety and simplicity is disclosed in Japanese Patent Application Laid-Open No. 2003-337887.

In order to realize such a system, a scheme has been proposed in which a built-in IC card in a mobile terminal and a program (hereinafter, referred to as a "terminal program") also stored in the same mobile terminal perform transmission and reception of a message therebetween for cooperative operation. In such a scheme, a terminal program transmits a message to an IC card or another terminal program by giving a predetermined message to a library provided on a mobile terminal. A predetermined message is, for example, a source ID (src), a destination ID (dst), a message type (mtype), and message contents (param).

In the scheme mentioned above, a program (a handler) for notifying reception of a message is set in advance in the terminal program along with conditions of messages desired to be received. Due to this, the terminal program can receive a message with calling by the handler as a cue when a message in accordance with the above-mentioned conditions is received. Since a message can be transmitted from a remote terminal device via an external network such as a public line, an unauthorized remote message may be transmitted to the mobile terminal in some cases. However, if the terminal program sets the conditions mentioned above to reception of messages, it is possible to preclude unauthorized messages.

SUMMARY OF THE INVENTION

According to the above-mentioned scheme, it is possible to preclude unauthorized messages transmitted from the outside of a mobile terminal, however, concerning a message once received, an apprehension is not yet overcome that a terminal program itself may deceive an IC card by fraudulently assuming its source. In other words, conventionally, it is possible for a terminal program to give an arbitrary ID as a source ID of a message, therefore, it is also possible for an unauthorized terminal program (or its user) to transmit a message the source of which is an ID of an authorized terminal program (arrogation of a source ID).

Further, even if no transmission of a message the destination of which is an unauthorized terminal program is performed, there still remains an apprehension that a message once received by an authorized terminal program is grabbed by an unauthorized terminal program.

Because of these reasons, there is a possibility that an IC card of a mobile terminal performs transmission and reception of a message with a destination not desired originally, and this has constituted a limiting factor of security of an IC card and eventually a mobile terminal.

Therefore, an object of the present invention is to improve security of a mobile terminal that performs transmission and reception of messages between an IC card and a terminal program by preventing arrogation of a message source and grab of a message.

In a mobile terminal according to the present invention, which performs transmission and reception of messages between an authentication device and a source, the source comprises: an identifier generation means for generating an identifier of the source using domain information of the authentication device prior to a request for a message to the authentication device; a message generation means for generating a message a source of which is the source identifier generated by the identifier generation means and a destination of which is an identifier of the authentication device; and a transmission means for transmitting the generated message to the authentication device when the identifier of the authentication device is held in a hold means, and the authentication device comprises: an authentication means for judging, as to the source identifier of the message transmitted by the transmission means, whether or not the domain information and the domain information of the authentication device agree with each other; and a process execution means for executing a process in accordance with the message when the authentication means judged the agreement.

An authentication method according to the present invention comprises, in a mobile terminal that performs transmission and reception of messages between an authentication device and a source, the steps of: generating an identifier of the source using domain information of the authentication device prior to a request for a message to the authentication device; generating a message a source of which is the generated source identifier and a destination of which is an identifier of the authentication device; and transmitting the generated message to the authentication device when the identifier of the authentication device is held in a hold means, on the part of the source, and the steps of: judging, as to the source identifier of the message, whether or not the domain information and the domain information of the authentication device agree with each other; and executing a process in accordance with the message when they are judged to agree, on the part of the authentication device.

In a state in which a source identifier can be known by another source (a terminal program or an IC card), there is a possibility that the source having an authorized identifier may incur harm due to the arrogation of source identifier by the source (for example, an imposture). According to a mobile terminal of the present invention, a source identifier is composed so as to include at least domain information and only when both agree with each other, execution of the process directed by a message is permitted. In other words, since inherent information obtained from an authentication device that is the destination of the message is used as information for judging the possibility of an imposture, unless the source spontaneously leaks the information to another source, it is unlikely that another source fraudulently assumes the identifier. Due to this, for example, message transmission from a source having domain information different from that of the authentication device is precluded and validity of the message source is assured. As a result, arrogation of a source is prevented and security of a mobile terminal is improved.

Further, in a mobile terminal according to the present invention, which performs transmission and reception of messages between an authentication device and a source, the source comprises: a hold means for holding a source identifier composed so as to include a port information acquired from the authentication device and a domain information of the authentication device by associating it with a notification program (a so-called call-back handler) executed upon receipt of a message, prior to the reception of the message transmitted from the authentication device; a judgment means for judging whether or not a destination identifier of the message (the source identifier, which is a destination viewed from the authentication device) and the source identifier held in the hold means agree with each other, when the message is received; and a process execution means for executing a notification program corresponding to the source identifier using the message when the judgment means judges the agreement.

An authentication method according to the present invention comprises, in a mobile terminal that performs transmission and reception of messages between an authentication device and a source, the steps of: holding a source identifier composed so as to include port information acquired from the authentication device and domain information of the authentication device in a hold means by associating it with a notification program executed upon receipt of a message, prior to the reception of the message transmitted from the authentication device; judging whether or not a source identifier (the source identifier, which is a destination viewed from the authentication device) of the message and the source identifier held in the hold means agree with each other, when the message is received; and executing a notification program corresponding to the source identifier using the message when they are judged to agree, on the part of the source.

Even if a message is requested for from an authorized source, it is not necessarily true that the message is used by the source. In other words, there still remains a possibility that before the message reaches the authorized source or after the message reached once, the message may be obtained (grabbed) by an unauthorized source for some reason. In this case, there is a possibility that the authorized source may incur harm due to abuse of the message by the source. Such an apprehension is not overcome only by the reception of the message by the authorized source, and it is necessary to further take measures not to permit the use of the message by an unauthorized source.

Therefore, in a mobile terminal according to the present invention, when an authorized source generates an identifier of its own, a notification program associated with the identifier is held. Since, for generation of an identifier, inherent information obtained from the authentication device, which is the source of the message, is used, unless the source spontaneously leaks the information to another source, it is unlikely that another notification program is associated with the identifier. In other words, as long as the source identifier is specified in the destination identifier (the identifier of the source, which is a destination viewed from the authentication device) of the received message, it is unlikely that a notification program other than the notification program corresponding to the identifier is executed by the message. Therefore, it is meaningless even if a source (for example, an authorized source) other than a source the destination of which is registered obtains a message before the message is received. To be more specific, since the source that grabbed the message has no notification program with a matching identifier, the reception of the message is not recognized or the notification program is not executed, therefore, such a grab makes no sense.

As a result, a grab of a message is suppressed and the security level of a mobile terminal is increased.

It is preferable for a mobile terminal according to the present invention to further comprise: a remote authentication means for judging whether or not a domain information of a source identifier of a message is included in a domain information held by the mobile terminal when the message transmitted from a place remote from the mobile terminal is received; and a transfer means for transferring the message to the destination when the judgment result by the remote authentication means is that the domain information of the source identifier is not included in the domain information.

Normally, a domain is formed with a group of terminals adjoining each other in terms of distance as a unit, therefore, it will not happen in essential that a mobile terminal belongs to a domain formed at a remote place from the mobile terminal. Therefore, despite that a message is received from a place remote from the mobile terminal, when the same domain information as that held by the mobile terminal is included, it is effective to judge that the source of the message is fraudulently assumed in order to assure higher safety. According to the present invention, only when a domain information of a source identifier of a message transmitted from a remote place is not held in the mobile terminal, the message is transferred to the destination. In other words, when the possibility is strong that the message transmitted from a remote place may fraudulently assume a source, the mobile terminal does not transfer the message but discards it. As a result, it is made possible to prevent an arrogation of a source as to a message from a remote terminal.

Further, in the mobile terminal according to the present invention, it may also be possible that the authentication device further comprises a verification means for judging, as to a type of a message transmitted remotely, whether or not the type and a message type for which remote transmission is permitted agree with each other, and the process execution means executes a process in accordance with the message when at least one of the pieces of domain information and the message types agree.

According to the present invention, when a message is transmitted remotely, prior to the execution of process, a judgment as to whether or not the remote transmission of the message is permitted is made, in addition to the collation of domain information between the source and the destination of the message. Then, even if both pieces of the domain information do not agree with each other, a process in accordance with the message is executed provided the remote transmission is permitted. On the contrary, even if the remote transmission is not permitted, a process in accordance with the message is executed provided the pieces of domain information agree.

Conditions for precluding messages can be set arbitrarily by a source (for example, a terminal program). Because of this, in a case where an authorized source invades a mobile terminal, there is a possibility that the conditions for precluding remote messages, which have been normally set, may be rewritten illegally. Therefore, in order for a mobile terminal to maintain the security level, safety for a message transmitted from a remote place must be taken into account. According to the present invention, it is also made possible to relax the conditions for successful authentication as to a message transmitted to the mobile terminal from a remote place while precluding unauthorized messages (for example, a message the source of which is assumed fraudulently or a message for which remote transmission is not permitted).

In a mobile terminal according to the present invention, it is more preferable for the identifier generation means of the source to acquire, prior to a request for a message to the authentication device, port information updated in the authentication device.

According to the present invention, the source identifier is generated along with not only the domain information of the authentication device but also the port information updated in the authentication device. Then, unless both pieces of information agree, a process in accordance with the message is not executed. Due to this, it is also made possible to preclude transmission of a message from a source not given domain information by the authentication device, as well as transmission of a message from a source having domain information different from that of the authentication device, and the validity of the message source is assured more certainly. As a result, an arrogation of a source is prevented and the security of a mobile terminal is further improved.

Note that, with the view of further improving the certainty of prevention of an arrogation of a source, it is preferable that the same port information as that once set be not set two or more times in a single mobile terminal. Due to this, duplication of port information in the same mobile terminal is avoided.

The authentication device may be an IC card and the source may be a terminal program. It is possible for the same mobile terminal to comprise an IC card and a terminal program such that messages can be transmitted and received to and from each other. Although the mobile terminal may comprise two or more IC cards and terminal programs, respectively, when comprising one IC card and one terminal program, the mobile terminal may have a configuration as described below. In other words, a mobile terminal according to the present invention comprises an IC card as the authentication device, further comprises a terminal program as the source, and performs transmission and reception of the message between the IC card and the terminal program. With a mobile terminal having such a configuration, it is also possible to similarly prevent arrogation of a message source and grab of a message, therefore, improvement of the security by precluding unauthorized programs can be realized.

According to the present invention, in a mobile terminal that performs transmission and reception of messages between an authentication device (for example, an IC card) and a source (for example, a terminal program), by preventing arrogation of a message source or grab of a message, it is made possible to improve the security of the mobile terminal.

BRIEF DESCRIPTION OF THE DRAWINGS

FIG. 3(a) is a diagram showing an example of data storage in a program identifier hold section.

FIG. 3(b) is a diagram showing an example of data storage in a remote transmission permission/refusal table.

FIG. 7 is a diagram for explaining the latter half part (when the destination is an IC card) of the arrogation prevention processing as to a message transmitted from the outside of a mobile terminal.

DESCRIPTION OF THE PREFERRED EMBODIMENTS

An embodiment of the present invention will be described below with reference to drawings attached for exemplification.

Figure 1:
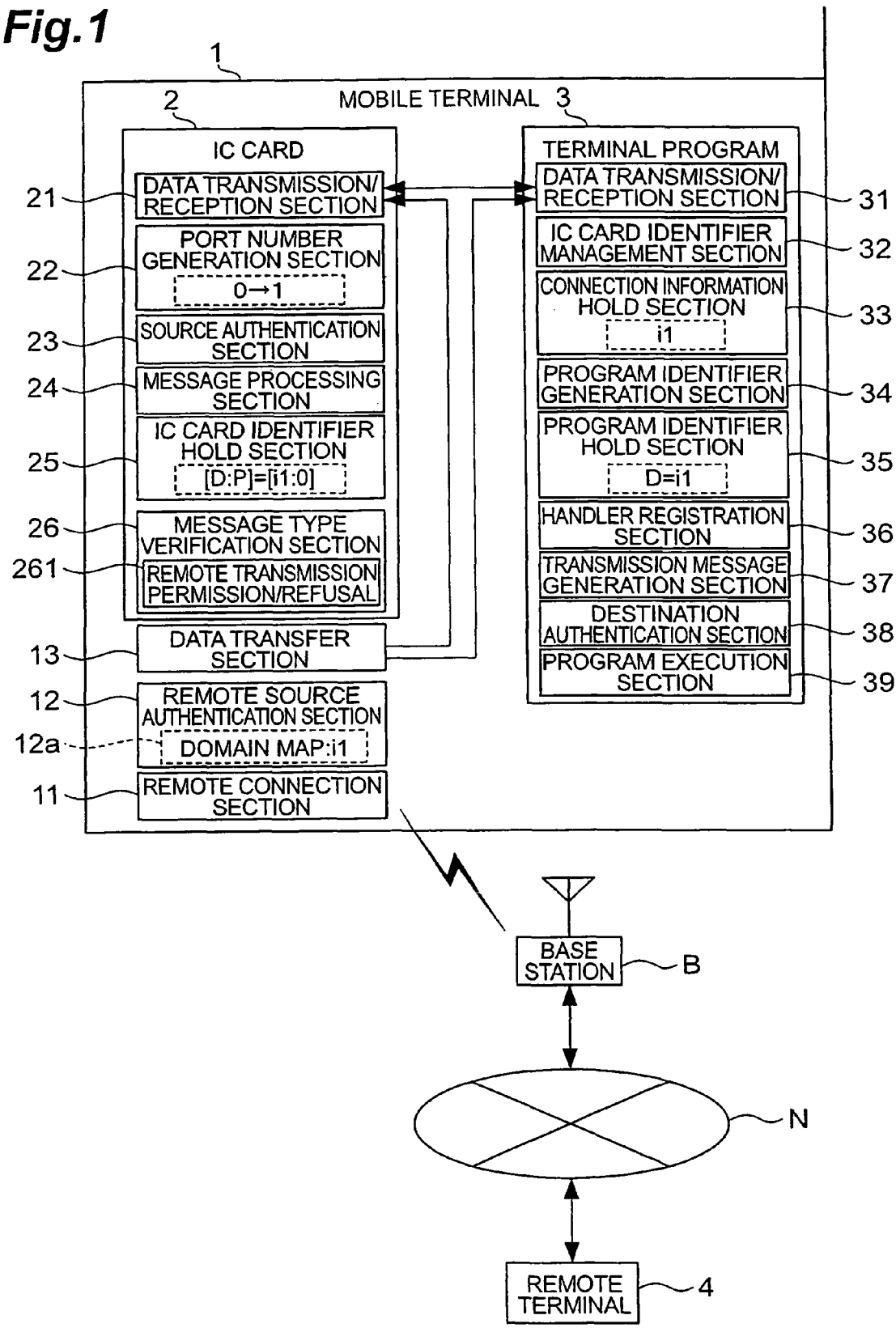
FIG. 1 is a diagram showing a functional configuration of a mobile terminal according to the present invention.

A mobile terminal 1 in the present embodiment includes at least an IC card 2 (corresponding to an authentication device) and a terminal program 3 (corresponding to a source) as shown in FIG. 1. The mobile terminal 1 may be, for example, a mobile phone or a PDA (Personal Digital Assistance), however, is not limited by its functions or uses as long as it is a terminal device with a communication facility. Further, there may be two or more IC cards and terminal programs.

The mobile terminal 1 includes a remote connection section 11, a remote source authentication section 12 (corresponding to a remote authentication means), and a data transfer section 13 (corresponding to a transfer means) in order to prevent an arrogation of a source by a message (a remote message) transmitted from a remote terminal 4. The respective components are connected allowing mutual input and output of signals via a bus (not shown).

The remote connection section 11 can connect with a base station B via a radio link and receives a message transmitted from the remote terminal 4 via a public line network N and the base station B.

The remote source authentication section 12 has a domain map 12a. In the domain map 12a, a domain ID (corresponding to domain information) is registered as an identifier of a domain to which an IC card that the mobile terminal 1 comprises belongs. In the present embodiment, the IC card that the mobile terminal 1 comprises is only the IC card 2, therefore, "i1" is held in the domain map 12a. Based on whether or not a domain part (the above-mentioned domain ID) of a source ID included in a received message is already registered in the domain map 12a, the remote source authentication section 12 judges whether or not the message is one whose source is an arrogation. If the judgment result is that the message is one whose source is an arrogation, the message is discarded and if the judgment result is that the message is one whose source is not an arrogation, the message is output to the data transfer section 13 in the post-stage.

From the destination ID included in the message input from the remote source authentication section 12, the data transfer section 13 identifies its destination and transfer the message. If the destination ID is an identifier of the IC card, the above-mentioned message is transferred to the IC card 2 and if the destination ID is an identifier of the terminal program, the message is transferred to the terminal program 3.

The IC card 2 is configured so as to include a data transmission/reception section 21, a port number generation section 22, a source authentication section 23 (corresponding to an authentication means), a message processing section 24 (corresponding to a process execution means), an IC card identifier hold section 25, and a message type verification section 26 (corresponding to a verification means). The respective components are connected allowing mutual input and output of signals via a bus (not shown). It is preferable for the IC card 2 to have the properties against tamper with the view of assuring high secrecy from and resistance to the external programs and apparatuses.

The data transmission/reception section 21 performs transmission and reception of data with a terminal program 3 via a bus. The data includes not only a message but also the identifier and the port number (corresponding to the port information) of the IC card 2.

A message received or transmitted in the present embodiment is expressed in the form of <source ID, destination ID, message type, message content> including an attached drawing. "En (n is a natural number)" in the message type indicates that the processing in the IC card 2 has ended abnormally.

The port number generation section 22 acquires an already existing port number upon a request for a port number from the terminal program 3 and generates a new port number by adding a predetermined number to the value. For example, when the already existing port number is "0", by increasing it by "1" as a predetermined number, the port number is updated to "1".

The source authentication section 23 collates, as to the source ID of the message received from the data transmission/reception section 21, its domain ID with the domain part of the identifier of the IC card 2. Only when the result of collation is that both values agree, the authentication is regarded as successful. The result of the successful authentication is notified to the message processing section 24. The result of failed authentication is notified to the source of the message. Such authentication processing is a function constituting the essential part of the mobile terminal 1 according to the present invention, therefore, it will be described in detail in the explanation of operation.

With the notification to the effect that the authentication processing by the source authentication section 23 has succeeded as a trigger, the message processing section 24 executes a process in accordance with the type and the content of the above-mentioned message.

In the IC card identifier hold section 25, the identifier of the IC card 2 is stored. In the present embodiment, the identifier is expressed in the form of [D:P] using the separator ":" for expression. The IC card 2 is assigned with an identifier [i1:0]. "i1" corresponding to D is an ID of the domain to which the IC card 2 belongs and "0" corresponding to P denotes a port number in the corresponding domain.

The message type verification section 26 has a remote transmission permission/refusal table 261 in advance. In the remote transmission permission/refusal table 261, as shown in FIG. 3 (b), permission or refusal of remote transmission is held for each message type. When the message received by the data transmission/reception section 21 is one input from the data transfer section 13, the message type verification section 26 judges it to be one from a remote place and judges permission or refusal for remote transmission by referring to the above-mentioned table 261. When the result of judgment is that the remote transmission of the received message is permitted, the authentication is regarded as successful. The result of the successful authentication is notified to the message processing section 24. The result of the failed authentication is notified to the source of the message.

The terminal program 3 is an application program for processing of predetermined data and does not have an identifier in its initial state. The terminal program 3 includes a data transmission/reception section 31 (corresponding to a transmission means), an IC card identifier management section 32, a connection information hold section 33, a program identifier generation section 34 (corresponding to an identifier generation means), a program identifier hold section 35, a handler registration section 36 (corresponding to a hold means), a transmission message generation section 37 (corresponding to a message generation means), a destination authentication section 38 (corresponding to a judgment means), and a program execution section 39 (corresponding to a process execution means). The respective components are connected allowing mutual input and output of signals via a bus (not shown).

The data transmission/reception section 31 performs transmission and reception of data with the IC card 2 via a bus. The data includes not only a message but also a signal that requests generation of a port number.

The IC card identifier management section 32 acquires its identifier from the IC card 2 and holds it. As described above, in the present embodiment, [i1:0] is acquired and held.

The connection information hold section 33 can be accessed by the program identifier generation section 34 and holds "i1" as information for identifying the domain to which the terminal program 3 belongs.

The program identifier generation section 34 generates a program identifier (corresponding to a source identifier) by combining the domain ID held by the connection information hold section 33 and the port number received from the IC card 2. In other words, the program identifier includes not only the identifier of the terminal program 3 but also the port number assigned by the IC card 2 individually for each terminal program. Therefore, the terminal program other than the terminal program 3 cannot generate the same identifier as that of the terminal program 3 unless the port number is obtained, as a result, an arrogation of an identifier is precluded.

In the program identifier hold section 35, the domain ID acquired from the connection information hold section 33 by the program identifier generation section 34 is held temporarily. Further, the program identifier consisting of the domain ID and the port number is held by being associated with the handler of the terminal program 3 (corresponding to a notification program). Furthermore, the program identifier hold section 35 also holds the information (reference information) to be notified to a user when a program identifier is assigned to the handler. Due to this, even if an unauthorized handler exists in the terminal program 3, it is possible to detect it at the time of assignment of the program identifier.

The handler registration section 36 has a callback handler in advance as a program for notifying the reception of a message. Then, the program identifier and the reference information described above are associated with the handler and the information is held by the program identifier hold section 35.

The transmission message generation section 37 generates a message to be sent to the IC card 2. At the time of generation, the program identifier ("i1:1" in the present embodiment) acquired from the program identifier hold section 35 is used as the source ID. As the destination ID, the identifier ("i1:0" in the present embodiment) held in the IC card identifier management section 32 is used. Further, in accordance with its purpose and function, by associating the message type "tn" and the content "nm" (n is a natural number) with this, for example, a message <i1:1, i1:0, tn, mn> is generated.

The destination authentication section 38 collates the destination ID of the message received by the data transmission/reception section 31 and the program identifier held in the program identifier hold section 35 and judges whether or not they agree. When they agree, the program execution section 39 in the post-stage is notified of the fact that the authentication has succeeded along with the handler corresponding to the above-mentioned identifier. When they do not agree, an error message indicating "there is the possibility of grab" is output.

Upon receipt of the notification that authentication has succeeded from the destination authentication section 38, the program execution section 39 executes the handler notified together with the received message as an argument. The handler is one the program identifier of which agrees therewith as a result of the authentication by the destination authentication section 38.

Next, with reference to the accompanied drawings, in addition to the operation of the mobile terminal 1 in the present embodiment, the respective steps constituting the authentication method according to the present invention, is explained.

The mobile terminal 1 is in operation to activate the built-in terminal program 3. Prior to message transmission and reception with the terminal program 3, the mobile terminal 1 executes the process in accordance with a flow chart in FIG. 2.

Figure 2:
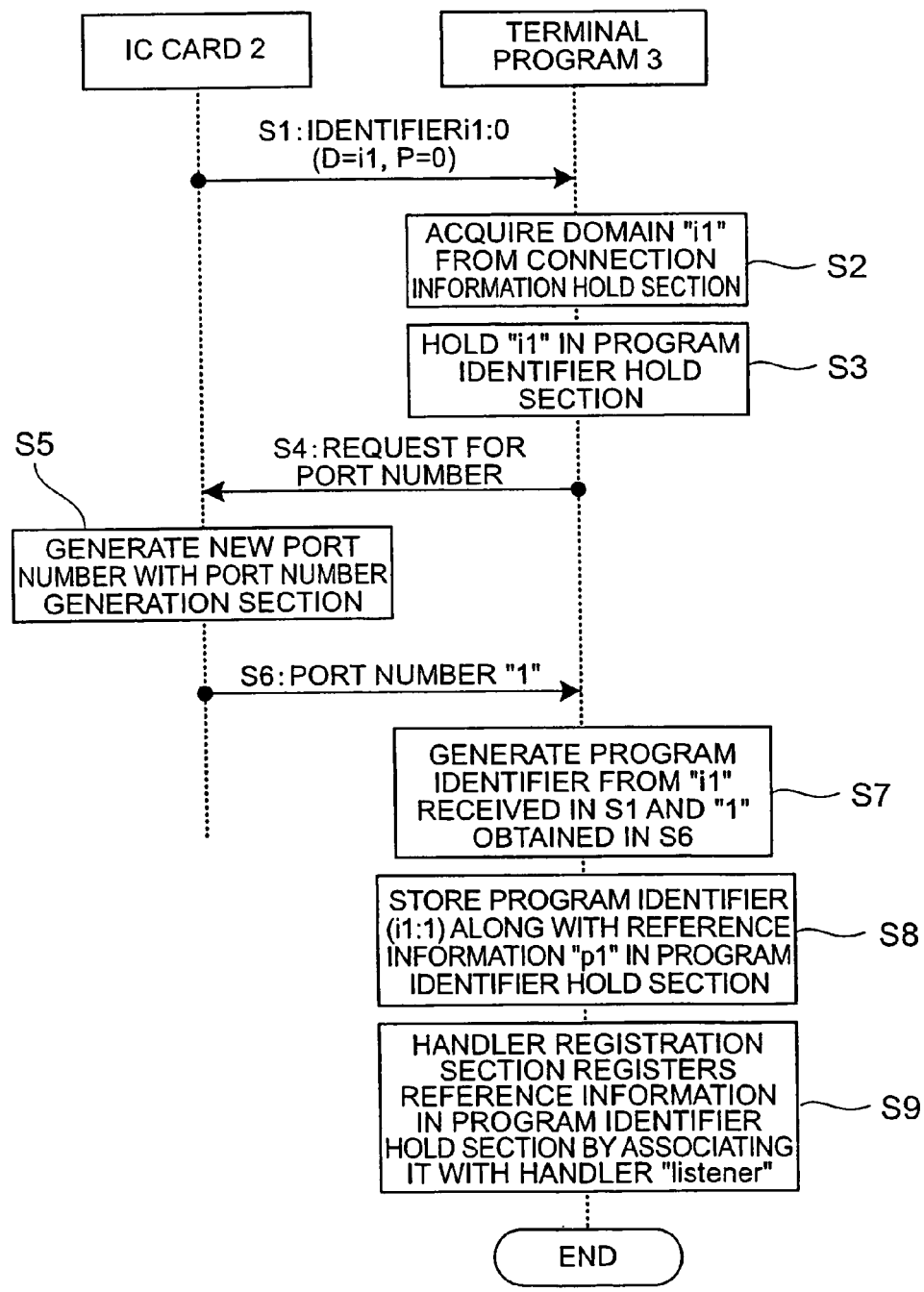
FIG. 2 is a diagram for explaining preparatory processing for arrogation prevention processing and grab prevention processing executed by a mobile terminal.

First, the IC card 2 transmits the identifier of its own [i1:0] held in the IC card identifier hold section 25 to the terminal program 3, which becomes a destination of a message, with the data transmission/reception section 21 (S1 in FIG. 2). The transmission of the identifier may be performed by the IC card 2 spontaneously or performed in response to the transmission request from the terminal program 3.

When receiving the above-mentioned identifier with the data transmission/reception section 31, the terminal program 3 holds this in the IC card identifier management section 32 (S1).

At this time, "i1" corresponding to the domain part of the above-mentioned identifier is stored uniquely in the connection information hold section 33 as the domain ID of the terminal program 3 and the program identifier generation section 34 acquires the domain ID (S2). The acquired domain ID is held temporarily in the program identifier hold section 35 (S3). Then, the program identifier generation section 34 requests for a port number to the IC card 2 corresponding to the domain ID "i1" held in S3 (S4) via the data transmission/reception section 31.

The IC card 2 to which a port number has been requested from the terminal program 3 acquires "0", which is an already existing port number, with the port number generation section 22 and generates a new port number "1" by adding 1 to the current value (S5). At the same time, the previous port number "0" is updated to "1". As to the update of the port number, an example is shown in which the increment is 1, however, any reduced or random value may be acceptable provided it does not coincide with any of the previous port numbers. The increment or decrement may also be 2 etc., that is, arbitrary.

The generated port number "1" is transmitted to the terminal program 3 by the data transmission/reception section 21 as a response to the request in S4 (S6).

The terminal program 3 generates a program identifier with the reception of the port number as a trigger. In other words, the program identifier generation section 34 generates, from "i1" received from the IC card 2 in S1 and the port number "1" received in S6, a program identifier (i1:1), which is a combination thereof (S7). Further, the program identifier generation section 34 stores the program identifier along with reference information "p1", which is its object reference, in the program identifier hold section 35 (S8). Incidentally, the reference information "p1" may be the same value as that of the program identifier.

In S9, the handler registration section 36 gives a correspondence relationship with the above-mentioned reference information to the handler "listener" as a notification program and registers it in the program identifier hold section 35. As a result, the program identifier hold section 35 enters into a data storage state shown in FIG. 3(a).

Note that the above-mentioned reference information is notified to a user when a program identifier is assigned to the terminal program 3. As described above, by using the reference information in registering a handler, another terminal program is prevented from registering a handler for "grab".

When preparatory processing for message transmission/reception shown in FIG. 2 is completed, processing for prevention of an arrogation of a source is performed. Hereinafter, with reference to FIG. 4, the processing will be described.

First, when a user directs message transmission from the terminal program 3 to the IC card 2, the transmission message generation section 37 generates a message to be transmitted.

Figure 4:
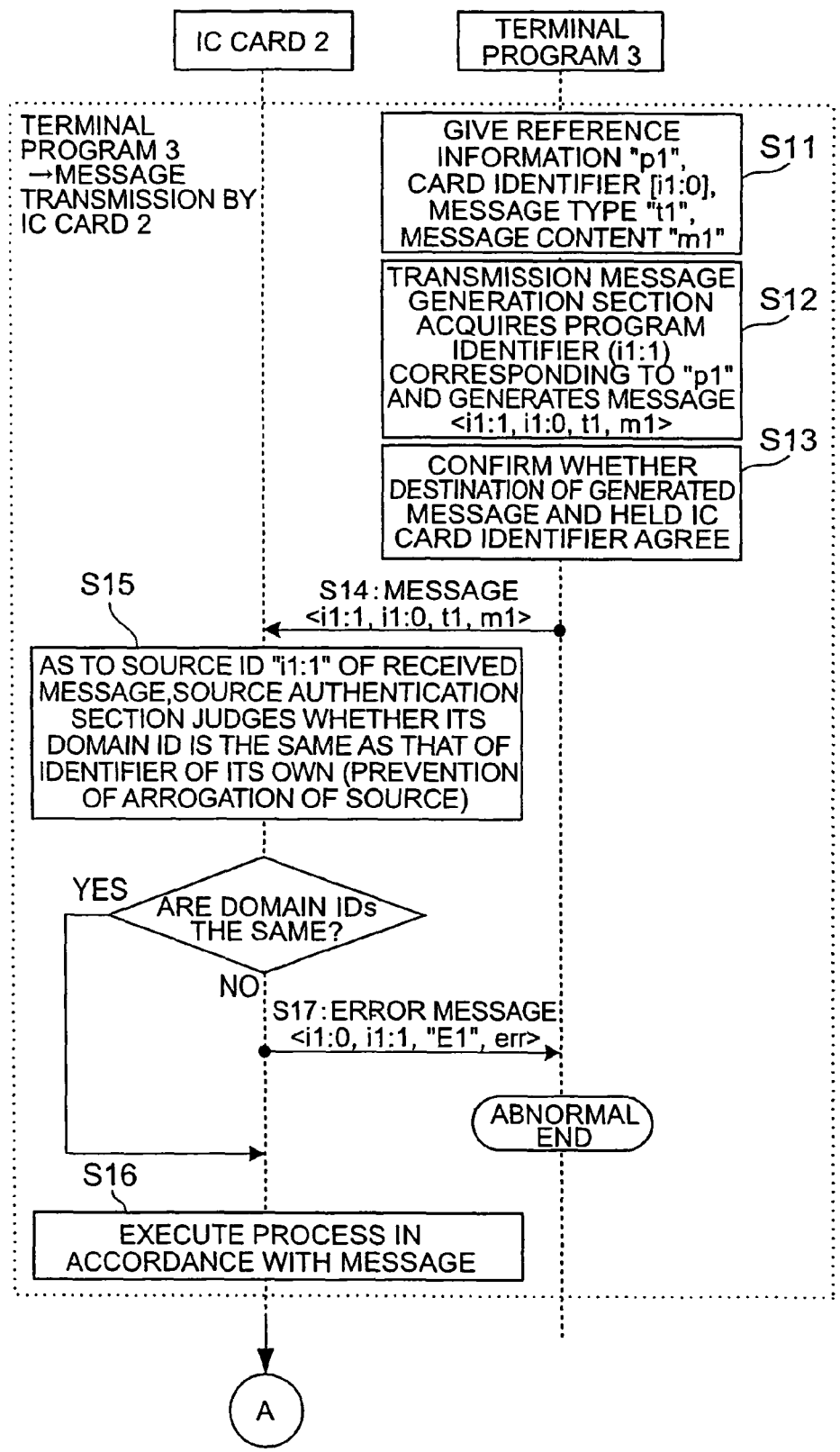
FIG. 4 is a diagram for explaining arrogation prevention processing as to a message transmitted from the inside of a mobile terminal.

In the present embodiment, a case is supposed where the reference information "p1", the identifier [i1:0] of the IC card 2, the message type "t1", and the message content "m1" are given at the time of generation of a message (S11 in FIG. 4).

The transmission message generation section 37 acquires the program identifier (i1:1) corresponding to the reference information "p1" from the program identifier hold section 35 and generates a message <i1:1, i1:0, t1, m1> by combining the information with the specified message type and content (S12). After confirming that the destination "i1:0" of the message is identical to [i1:0], which is the identifier of the IC card 2 held in S1 (S13), the transmission message generation section 37 directs the data transmission/reception section 31 to transmit the above-mentioned message.

In S14, the message generated in S12 is transmitted from the terminal program 3 with the IC card 2 as its destination.

When receiving the message with the data transmission/reception section 21, the IC card 2 confirms whether or not the source is fraudulently assumed with the source authentication section 23. Confirmation of the source is performed based on whether or not the domain ID constituting the source ID is the same as the information currently held by the IC card 2. In other words, the source authentication section 23 collates the domain ID "i1" with the domain part (domain ID) of the identifier of the IC card 2 of its own as to "i1:1", which is the source ID of the message received in S14. Then, whether or not they agree is judged (S15).

In the present embodiment, the identifier of the IC card 2 of its own is [i1:0] and both the domain IDs are "i1" (S15; YES). Therefore, the message processing section 24 of the IC card 2 performs predetermined processing in accordance with the message type "t1" and its content "m1" (S16). The result of the processing is output as an output message.

Further, when both the domain IDs do not agree (S15; NO), an error message (for example, <i1:0, i1:1, "E1", err>) the destination of which is the terminal program 3 is returned (S17) and a series of processing is stopped.

Incidentally, in S15 described above, along with the domain ID, whether or not the port numbers agree may be judged. In this case, only when both the domain IDs and the port numbers agree, the processing in S16 is performed.

Next, processing for preventing grab of a received message will be described with reference to FIG. 5.

Figure 5:
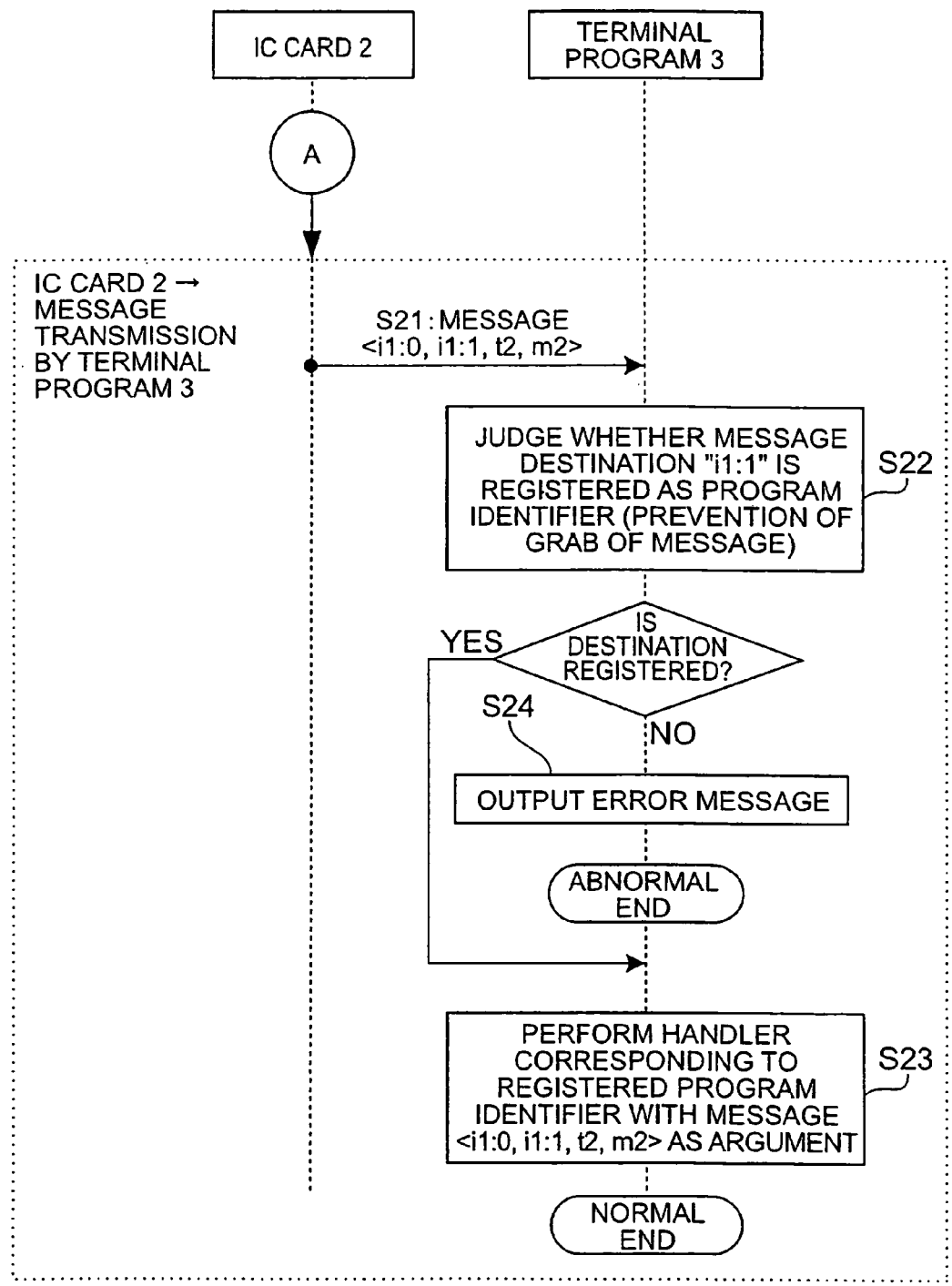
FIG. 5 is a diagram for explaining grab prevention processing executed by a mobile terminal.

When the processing in S16 is completed, the fact is notified to the terminal program 3 by a message <i1:0, i1:1, t2, m> (S21 in FIG. 5).

When receiving the message with the data transmission/reception section 31, the terminal program 3 extracts a destination ID from the message and searches the program identifier hold section 35. In other words, the source authentication section 38 judges whether or not "i1:1", which is the destination ID of the message received in S21, is held in the program identifier hold section 35 as a program identifier (S22).

Referring to FIG. 3(a) again, in the present embodiment, since (i1:1) as a program identifier is registered in the area 35b (S22; YES), authentication will succeed at this point. Therefore, the program execution section 39 executes the corresponding handler "listener" with the above-mentioned message as an argument (S23).

Note that in S22, when no corresponding program identifier exists in the program identifier hold section 35 (S22; NO), the received message is not used to perform the program, however, a message to that effect is output to the user (S24).

The message received in S21 is notified only by the handler (in the present embodiment, "listener") associated with the program identifier (i1:1) specified as its destination. In other words, it is unlikely that the message is notified to a terminal program without "listener" (that is, a program other than the terminal program 3). Because of this, it is not possible for another terminal program to perform "listener" with the above-mentioned message <i1:0, i1:1, t2, m2> as an argument and it is unlikely that the above-mentioned message is grabbed by another terminal program. Therefore, the message is unlikely to be output to the user and thus the grab of the message can be prevented.

Figure 6:
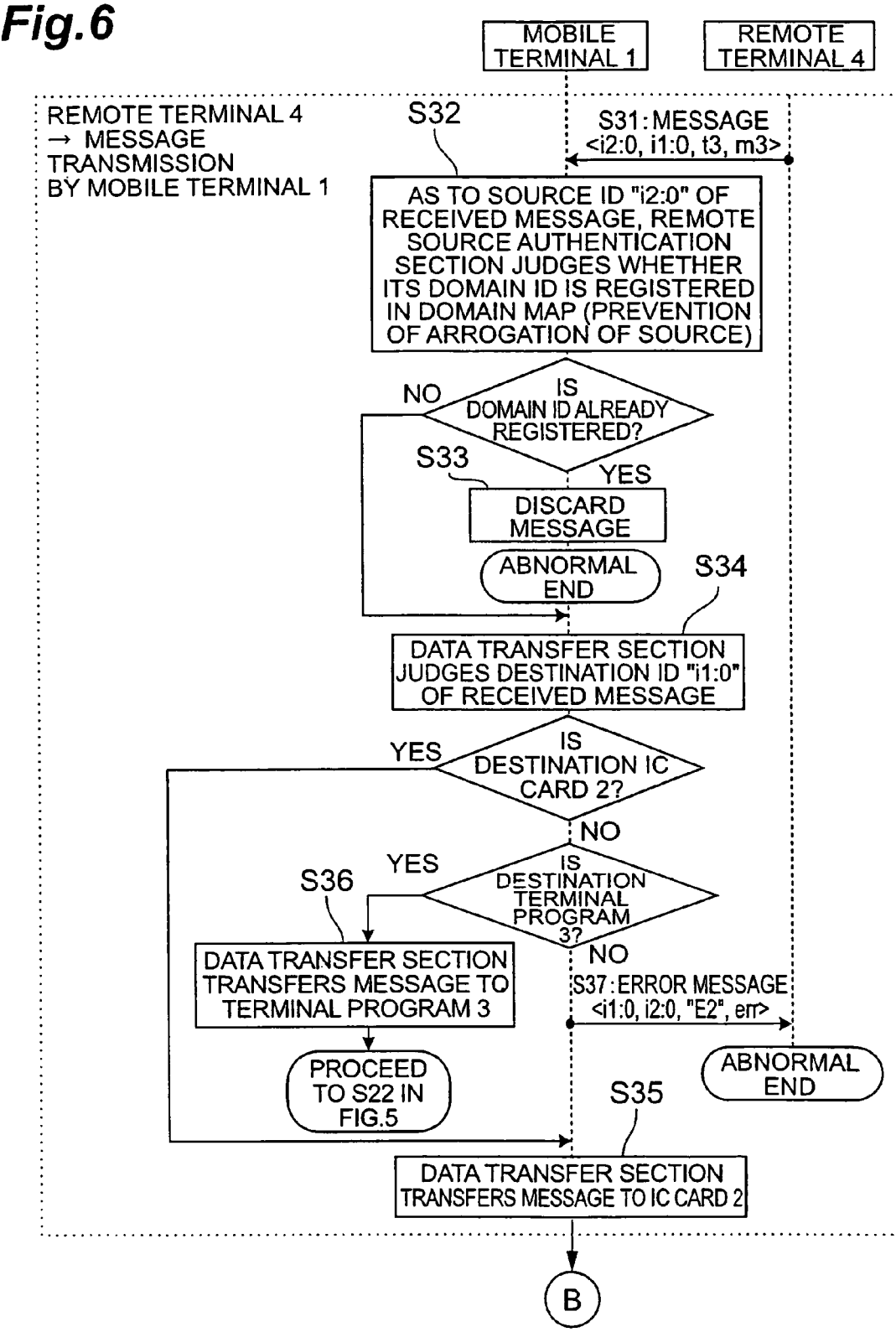
FIG. 6 is a diagram for explaining the former half part of the arrogation prevention processing as to a message transmitted from the outside of a mobile terminal.

Next, with reference to flow charts in FIG. 6 and FIG. 7, processing for preventing an arrogation of a source will be described in a case where message transmission from the outside of the mobile terminal 1 is supposed.

When a message <i2:0, i1:0, t3, m3> is transmitted from the remote terminal 4 to the mobile terminal 1 (S31 in FIG. 6), the mobile terminal 1 judges whether or not the message received by the remote connection section 11 is one the source of which is fraudulently assumed. This judgment is made based on whether or not the domain ID of the source ID "i2:0", which is extracted from the received message by the remote source authentication section 12, is registered in the domain map 12*a* (S32). At this point, the domain ID held in the domain map of the remote source authentication section 12 is only "i1".

If the domain ID is registered (S32; YES), it is normally impossible that the same domain ID is held by the mobile terminal 1 despite the fact that the message reached from a remote place, therefore, the remote source authentication section 12 judges that the source of the message is fraudulently assumed. For example, when the source ID of the message received by the remote connection section 11 is "i1:0", since "i1", which is its domain ID, is registered in the domain map 12*a* described above, it is possible to judge that the remote terminal 4 fraudulently assumes any one of the programs in the mobile terminal 1 as a source. As a result, the above-mentioned message received in S31 is discarded (S33). At this time, the mobile terminal 1 may notify the abnormality to the user or may record the occurrence of the abnormality in the log.

As a result of the judgment in S32, when the domain ID of the source ID is not registered in the domain map 12*a* (S32; NO), that is, when the message is transmitted from a domain not registered in the mobile terminal 1, if it is remote transmission, it is normal that the domain is different, therefore, it is unlikely that the source of the above-mentioned message pretends to be a program (for example, the terminal program 3) in the mobile terminal 1. Because of this, at the present time, it is not possible to judge that the source of the message is arrogation at least only by the domain ID. Therefore, processing proceeds to the next step, S33.

In S33, the data transfer section 13 identifies the destination from the destination ID of the above-mentioned message. In the present embodiment, the destination ID is "i1:0", therefore, the data transfer section 13 transfers the message to the IC card 2 having the identifier [i1:0] (S35).

When the identifier (i1:1) of the terminal program 3 is specified as the destination ID, processing proceeds to S36 and the received message is transferred to the terminal program 3. After this, processing proceeds to S22 shown in FIG. 5 and the same processing is performed.

Note that when the destination specified in S33 is not the IC card 2 or the terminal program 3, the destination of transfer does not exist in the mobile terminal 1, therefore, the processing ends abnormally as unknown destination. It may also be possible to notify the fact to the remote terminal 4, which is the original source of the message, via an error message <i1; 0, i2:0, "E2", err> as shown in S37.

Changing to FIG. 7, the message to be sent to the IC card 2 transferred from the data transfer section 13 in S35 is received by the data transmission/reception section 21 (S38).

In S39, the source authentication section 23 performs authentication of the source as to the above-mentioned message as in the processing in S15 shown in FIG. 4. In other words, the source authentication section 23 judges whether or not the domain ID is the same as that of the identifier of its own as to "i2:0", which is the source ID of the message received in S31 in order to detect an imposture of a source. If the domain IDs coincide, processing proceeds to S40 and if not, processing proceeds to S41. At this time, it may also be possible to judge whether or not the port numbers coincide along with the domain ID.

The result of the authentication in S39 is that the domain ID of the received message is the same as that of the identifier of its own (S39; YES), the source authentication section 23 judges that the message is not transmitted from a remote place and notifies the message processing section 24 of the fact. The message processing section 24 having received the notification executes the process in accordance with the message type "t3" and its content "m3" (S40).

In the present embodiment, however, while the identifier of the IC card 2 is [i1:0], the source ID of the received message is "i2:0", that is, the domain ID is different. Because of this, authentication processing based on the domain ID fails.

When the authentication processing in S39 fails, authentication processing by the message type verification section 26, that is, a judgment as to permission or denial of the remote transmission of the received message is performed (S41). This judgment is performed by the message type verification section 26 based on the type of the received message. In the present embodiment, the message type is "t3". Referring to FIG. 3(*b*), remote transmission is permitted for the message having the type "t3" in the remote transmission permission/refusal table 261 (S41; YES). Therefore, processing proceeds to S40 described above.

On the other hand, when it is judged that remote transmission is refused because of the type of the above-mentioned message (S41; NO), since the authentication of the source has also failed in S39, it is judged that the source of the received message is fraudulently assumed and the processing ends abnormally. At this time, it is possible for the remote connection section 11 to return an error message <i1; 0, i2:0, "E3", err> to the remote terminal 4 of the source (S42).

As explained above, according to the mobile terminal 1 equipped with the IC card 2, unless the information held by the IC card 2 and the terminal program 3, respectively, or at least the domain IDs agree, processing based on the message is not performed. Due to this, despite whether or not the source of the message is inside the mobile terminal 1, execution of the process by a program the source ID of which is fraudulently assumed is precluded. Further, unless the handler corresponding to the destination ID of the message is registered in the program, it is unlikely that the message is received by the program. Because of this, the grab of the message can be prevented.

Incidentally, the aspect described in the above-mentioned embodiment is just a preferred example of the mobile terminal according to the present invention, and the present invention is not limited to the aspect.

For example, in the above-mentioned embodiment, the mobile terminal 1 is described as one which has both the function of preventing arrogation of a source of a message (the first function: refer to FIG. 4, FIG. 6, and FIG. 7) and the function of preventing grab of a message (the second function: refer to FIG. 5), however, it may also be possible for the mobile terminal 1 to have only one of the functions. Even in such an aspect, it is possible for the mobile terminal 1 to have the individual functions and effects due to any one of the functions of its own. Specifically, by means of the first function, it is possible to avoid such a trouble that the authorized terminal program 3 incurs disadvantages or an unauthorized program obtains unfair profits as a result that the message contents to be directed by the terminal program 3 originally is directed by another program the source of which is fraudulently assumed. Further, by means of the second function, it is possible to avoid a situation in which a message is used in an unauthorized manner (a message is rewritten etc.) or grabbed as a result that the message to be received by the terminal program 3 originally is grabbed by another program. Due to this, the security as to transmission and reception of a message is improved in the mobile terminal 1.

Further, as to the arrangement of the respective components of the mobile terminal 1, it is possible to adequately make modification in the extent in which the above-mentioned first or second function can be effected such as one in which predetermined components are arranged outside the IC card 2 or the terminal program 3, not limited to the aspect described and shown above. For example, it is also possible to arrange the source authentication section 23 outside the IC card 2 to integrate it with the remote source authentication section 12 or to arrange the connection information hold section 33 and the handler registration section 36 outside the terminal program 3. Furthermore, it is also possible to cause the IC card 2 or the terminal program 3 to have one or two or more components out of the remote connection section 11, the remote source authentication section 12, and the data transfer section 13.

What is claimed is:

1. A mobile terminal including a terminal program and an IC device having a property against tamper, wherein the terminal program and the IC device perform transmission and reception of messages with respect to one another, the terminal program comprising:

an identifier generation means for generating an identifier of the terminal program using both domain information and port information of the IC device prior to transmitting a request for a message to the IC device, the port information including a port number uniquely generated by the IC device and provided to the terminal program such that the terminal program has obtained a port number from the IC device that is different than a port number that any other terminal programs in the mobile terminal have obtained from the IC device;

a message generation means for generating a message, a source of which is identified by the terminal program identifier generated by the identifier generation means and a destination of which is identified by an identifier of the IC device; and a transmission means for transmitting the generated message to the IC device when the identifier of the IC device is held in a hold means, and the IC device comprising:

an authentication means for judging, from the terminal program identifier of the message transmitted by the transmission means, whether or not the domain information and the port information in the terminal program identifier and the domain information the port information registered in the IC device agree; and a process execution means for executing a process in accordance with the message when the authentication means judges that the domain information and the port information in the terminal program identifier and the domain information and the port information registered in the IC device agree.

2. The mobile terminal according to claim 1, further comprising:

a remote authentication means for judging whether or not a domain information of a terminal program identifier of a message is included in a domain information held by the mobile terminal when the message transmitted from a place remote from the mobile terminal is received; and a transfer means for transferring the message to its destination when the judgment result by the remote authentication means is that the domain information of the terminal program identifier is not included in the domain information.

3. The mobile terminal according to claim 1, wherein the IC device further comprises:

a verification means for judging, from a type of a message transmitted remotely, whether or not the type and a message type for which remote transmission is permitted to agree with each other; and the process execution means executes a process in accordance with the message when at least one of the domain information and the message types agree.

4. A mobile terminal including a terminal program and an IC device having a property against tamper, wherein the terminal program and the IC device perform transmission and reception of messages with respect to one another, the terminal program comprising:

a hold means for holding a terminal program identifier including port information acquired from the IC device and domain information of the IC device by associating it with a notification program executed upon receipt of a message, prior to the reception of the message transmitted from the IC device, the port information including a port number uniquely generated by the IC device and provided to the terminal program such that the terminal program has obtained a port number from the IC device that is different than a port number that any other terminal programs in the mobile terminal have obtained from the IC device;

a judgment means for judging whether or not a destination identifier of the message and the terminal program identifier held in the hold means agree when the message is received; and a process execution means for executing a notification program corresponding to the terminal program identifier using the message when the judgment means judges that the destination identifier of the message and the terminal program identifier held in the hold means agree.

5. The mobile terminal according to claim 1 or 4, wherein an IC card is comprised as the IC device;

the terminal program is comprised in a source; and transmission and reception of the message is performed between the IC card and the terminal program.

6. An authentication method executed by a mobile terminal that performs transmission and reception of messages between an IC device and a terminal program, comprising:

generating an identifier of the terminal program using both domain information and port information of the IC device prior to transmitting a request for a message to the IC device, the port information including a port number uniquely generated by the IC device and provided to the terminal program such that the terminal program has obtained a port number from the IC device that is different than a port number that any other terminal programs in the mobile terminal have obtained from the IC device;

generating a message a source of which is the generated terminal program identifier and a destination of which is an identifier of the IC device; and transmitting the generated message to the IC device when the identifier of the IC device is held in a hold means;

judging, in the IC device, as to the terminal program identifier of the message, whether or not the domain information and the port information in the terminal program identifier and the domain information and the port information registered in the IC device agree with each other; and executing, in the IC device, a process in accordance with the message when it is judged that the domain information and the port information in the terminal program identifier and the domain information and the port information registered in the IC device agree.

7. An authentication method executed by a mobile terminal that performs transmission and reception of messages between an IC device and a terminal program, comprising:

holding a terminal program identifier including port information acquired from the IC device and a domain information of the IC device in a hold means by associating it with a notification program executed upon receipt of a message, prior to the reception of the message transmitted from the IC device, the port information including a port number uniquely generated by the IC device and provided to the terminal program such that the terminal program has obtained a port number from the IC device that is different than a port number that any other terminal programs in the mobile terminal have obtained from the IC device;

judging whether or not a terminal program identifier of the message and the terminal program identifier held in the hold means agree with each other, when the message is received; and executing a notification program corresponding to the terminal program identifier using the message when it is judged that the terminal program identifier of the message and the terminal program identifier held in the hold means agree.

8. A mobile terminal to perform transmission and reception of messages between an IC device and a terminal program, the terminal program comprising:

an identifier generation section configured to generate a terminal program identifier of the terminal program using both domain information and port information of the IC device prior to transmitting a request for a message to the IC device;

a message generation section configured to generate a message, a source of which is identified by the terminal program identifier generated by the identifier generation section and a destination of which is identified by an identifier of the IC device; and a transmission section configured to transmit the generated message to the IC device when the identifier of the IC device is held in a hold section; and the IC device comprising:

an authentication section configured to judge, from the terminal program identifier of the message transmitted by the transmission section, whether or not the domain information in the terminal program identifier and the domain information registered in the IC device agree; and a process execution section configured to execute a process in accordance with the message when the IC section judges that domain information in the terminal program identifier and the domain information registered in the IC device agree.

9. A mobile terminal to perform transmission and reception of messages between an IC device and a terminal program, the terminal program comprising:

a hold section configured to hold a terminal program identifier including port information acquired from the IC device and domain information of the IC device by associating it with a notification program executed upon receipt of a message, prior to the reception of the message transmitted from the IC device, the port information including a port number uniquely generated by the IC device and provided to the terminal program such that the terminal program has obtained a port number from the IC device that is different than a port number that any other terminal programs in the mobile terminal have obtained from the IC device;

a judgment section configured to judge whether or not a destination identifier of the message and the terminal program identifier held in the hold section agree when the message is received; and a process execution section configured to execute a notification program corresponding to the terminal program identifier using the message when the judgment section judges that the destination identifier of the message and the terminal program identifier held in the hold section agree.

* * * * *